Figure 3:
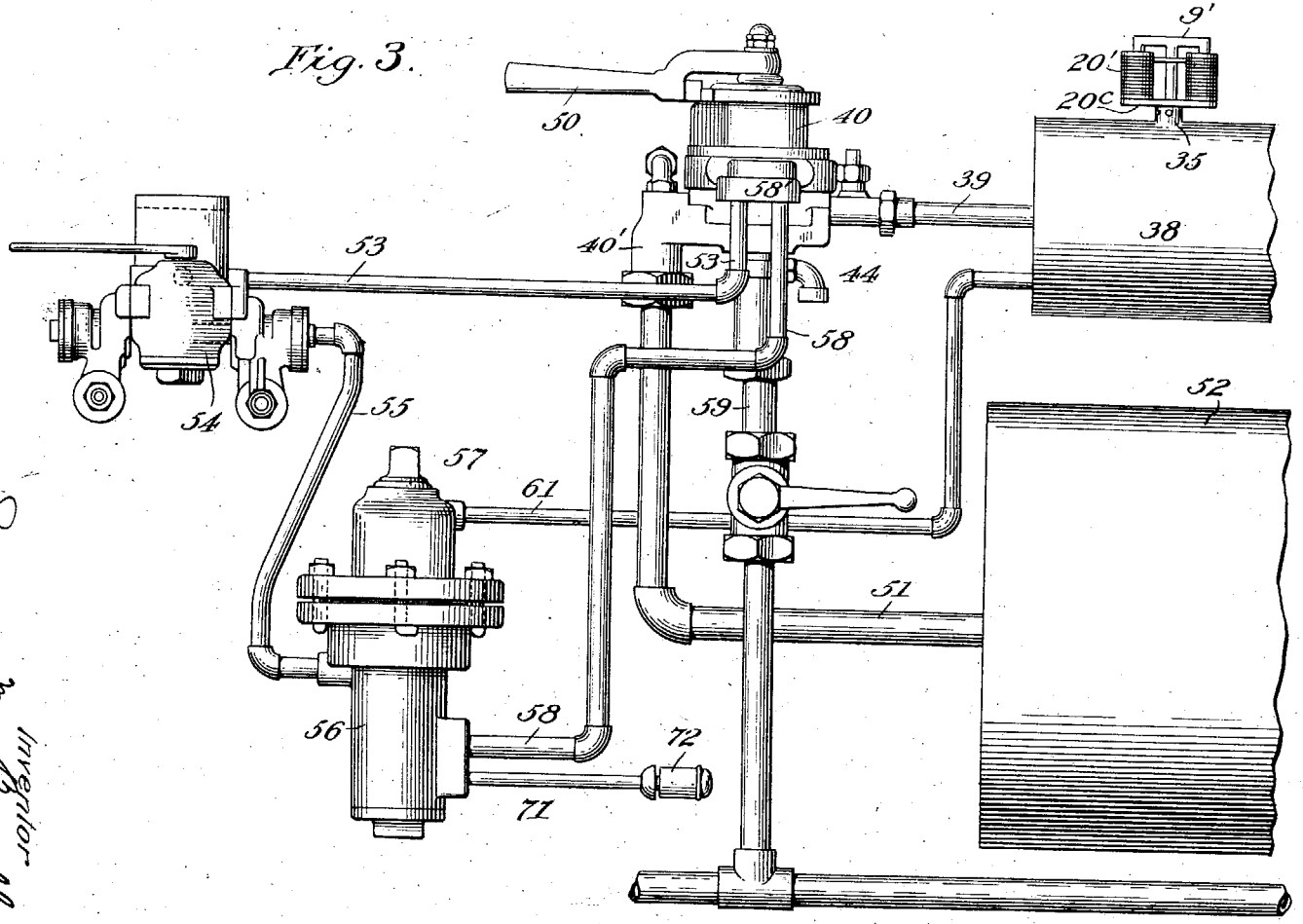

J. W. BUELL.
COMBINED AUTOMATIC TRAIN SIGNALING AND CONTROL SYSTEM.
APPLICATION FILED MAR. 28, 1918.
Reissued June 24, 1919.
14,676.
4 SHEETS—SHEET 1.
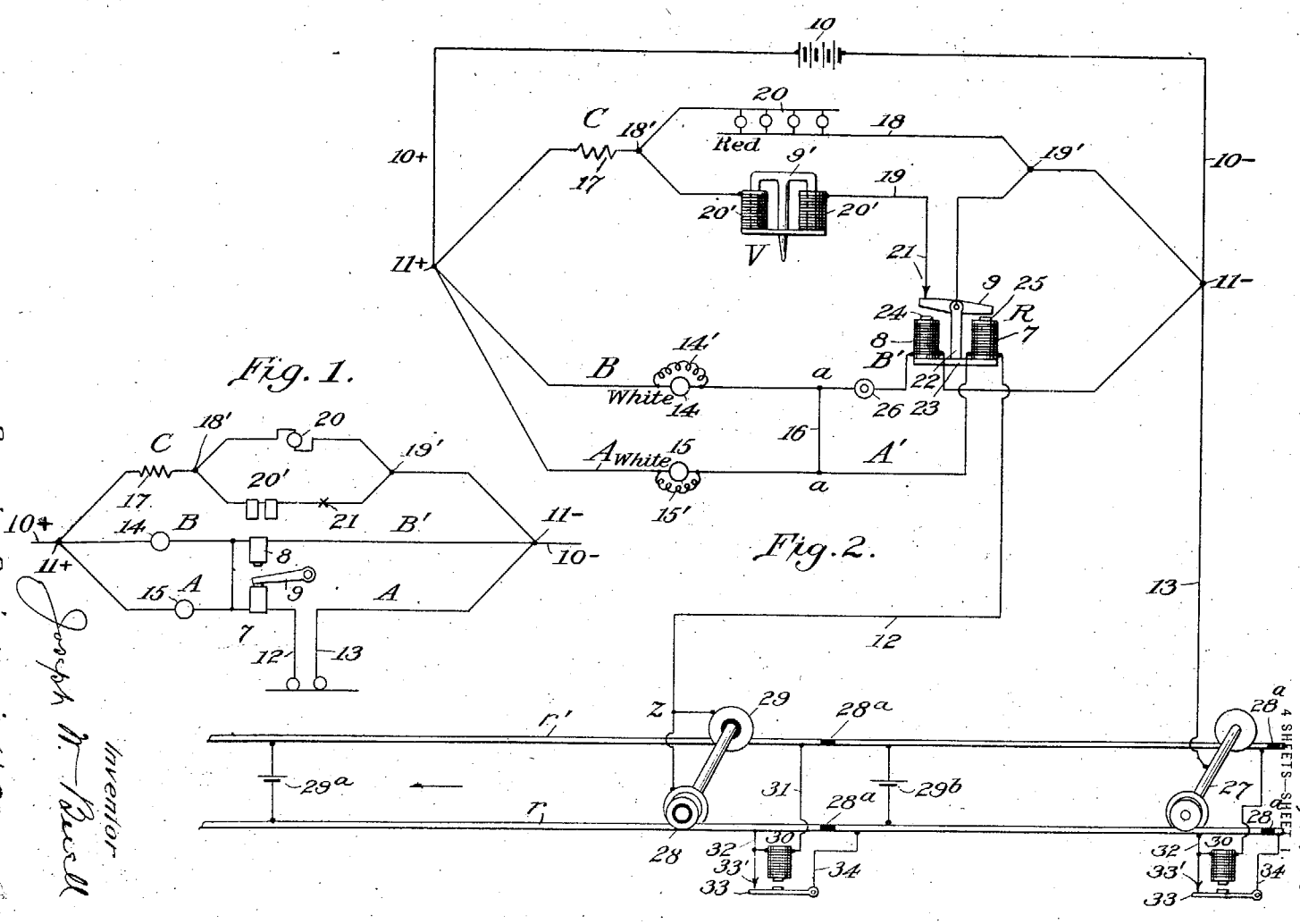
Inventor
Joseph W. Buell
Pennie, Davis, Marvin and Edmonds
Attorneys

J. W. BUELL.

COMBINED AUTOMATIC TRAIN SIGNALING AND CONTROL SYSTEM.

APPLICATION FILED MAR. 28, 1918.

Reissued June 24, 1919.

14,676.

4 SHEETS—SHEET 2.

Inventor

Joseph W. Buell

Pennie, Davis, Marvin and Edmonds

Attorneys

J. W. BUELL.

COMBINED AUTOMATIC TRAIN SIGNALING AND CONTROL SYSTEM.

APPLICATION FILED MAR. 28, 1918.

Reissued June 24, 1919.

14,676.

4 SHEETS—SHEET 3.

Inventor
Joseph W. Buell

Pennie, Davis, Marvin and Edmonds
Attorneys

J. W. BUELL.

COMBINED AUTOMATIC TRAIN SIGNALING AND CONTROL SYSTEM.

APPLICATION FILED MAR. 28, 1918.

Reissued June 24, 1919. 14,676.

4 SHEETS—SHEET 4.

Inventor
Joseph W. Buell

Pennie, Davis, Marvin and Edmonds

Attorneys

UNITED STATES PATENT OFFICE.

JOSEPH WHITMAN BUELL, OF WASHINGTON, DISTRICT OF COLUMBIA, ASSIGNOR TO BUELL SIGNAL AND TRAIN CONTROL COMPANY, INCORPORATED, A CORPORATION OF VIRGINIA.

COMBINED AUTOMATIC TRAIN SIGNALING AND CONTROL SYSTEM.

14,676. Specification of Reissued Letters Patent. Reissued June 24, 1919.

Original No. 1,181,730, dated May 2, 1916, Serial No. 427,456, filed April 16, 1908. Application for reissue filed March 28, 1918. Serial No. 225,327.

*To all whom it may concern:*

Be it known that I, JOSEPH W. BUELL, a citizen of the United States, residing at Washington, in the District of Columbia, have invented certain new and useful Improvements in Combined Automatic Train Signaling and Control Systems, of which the following is a specification.

This invention relates to a combined railway signaling and automatic train control system.

In order to clearly understand the nature and scope of the present invention it will first be considered with reference to its fundamental characteristics, which contemplate securing the automatic control of and signal production on a locomotive by a system so organized as to comprise the fewest possible number of components or elements so combined and functioning with reliability in relation and dependence throughout as to meet the engineering rule of "failure on the side of safety," and thereby secure the most perfect mutual dependence, and which at the same time calls forth in operation as a functional whole the fewest possible number of changes or sequences in the production of the result sought.

While it is essential to the reliability of a system of this kind that it must err on the side of safety, should anything go wrong, still the system should be so organized that frequent failure thereof should be eliminated, even though the failures were on the side of safety, because the frequent detention of trains becomes a serious inconvenience in that it upsets the orderly movement of traffic.

According to the plan of this invention the union between the track and the moving train apparatus necessarily involves the inclusion in the closed train carried circuit, at signal receiving points, of some element responsive to the condition of the track-circuit.

The closed intermediate train carried circuit employed is so associated with an electro-magnetic means and the element responsive to the condition of the said track-circuit as to fill the gap therebetween, at traffic controlling points, in a manner to remain operatively unaffected under safety conditions, and which will be interrupted under danger conditions, to cause an operative response of said electro-magnet.

It is therefore an essential characteristic of such a plan of control in the present invention to so dispose the normally completing or retaining portion of said closed train carried circuit relative to the track that upon its reaching the traffic control or signal receiving point there may be reliably substituted therefor a short conductor or partial circuit of determinate resistance, that is directly under the control of the adjacent track-circuit about to be entered, and to provide for such substitution in a manner to assure the transference of the current in said circuit without causing the disturbance of the normal current flow in said circuit, as would result in the actuation of the electro-magnet and the consequent production of a signal or train stop action, unnecessarily, under clear or safety conditions.

It is still further a characteristic of this invention to divide a trackway into blocks and to organize the traffic rails thereof into standard all-rail track-circuits, that are made coextensive with the block limits and which are electrically defined between their contiguous meeting ends by current obstructors; and to combine successively therewith a normally closed train carried circuit movable thereover which is controllably connected in a manner to obtain the constructive and protective result of making every foot of track an active factor in telling the safety and danger story, as the case may be.

To accomplish these ends the arrangement or combinations of electrical circuits forming the system is such that an obstructing train or other danger giving condition acts, first, on a normally closed all-rail track circuit section, in which the said train or danger giving condition is present, the change in said track circuit in turn affecting a normally closed partial circuit at a point where the said partial circuit normally bridges an insulated joint, (of a pair that define the respective block section limits) and which serves as a signal receiving and traffic controlling point; second, on a combined normally closed traveling wire and rail protective circuit arranged in connection with a locomotive that as it advances to the traffic controlling points presents, successively, the normally closed protective circuit to the compensating partial circuit or the resistance giving elements or insulated joints, as the case may be, that are arranged in the pathway of two or more traveling contacts on said locomotive, at the moment the said locomotive crosses from one block section to another; third, electro-magnetic or current actuated circuit controlling means located on the locomotive or train in operative relation to said normally closed protective circuit, the same being arranged in operative relation to two interrelated normally closed portions of said protective circuit, that are joined by the diagonal of a Wheatstone bridge, one of said circuits being constantly closed, while the other forms a partial circuit that includes in derivation, respectively, two differential branches, arranged in shunt relation, one of said branches comprising a light controlling means, and the other branch including a valve holding means, the latter branch being directly subject to the control of said electromagnetic governing means, said partial circuit terminating in connections with a rail or rails over which the train traverses and by the movement of the locomotive the said partial circuit is opened or maintained closed at certain prescribed traffic controlling points.

As the development of this system was coincident with a series of actual tests on a railroad it is believed that a better understanding of the nature and scope of the present invention can be had by considering the problems which rise, in the employment of a method and means that depend upon the presence of locomotive wheels upon the traffic rails alone for establishing or completing a normally closed train carried protective circuit, through the rail portions over which the locomotive is at any moment traveling and which utilizes the movement of said locomotive in its passage from one block section to another over gaps formed by insulated joints, to thereby cause at such points either a safe pathway for said train carried current with non-effect on the governing instrument under safety conditions or a modification or variation of the detecting current of said circuit under danger giving conditions, either of said conditions being imposed according to the influence of a track governing circuit. Under such a normally closed train carried circuit plan of operation there are two ways by which such a differential principle of control of the train carried circuit and governing instrument can be effected. 1st. By varying the external resistance at the block junctions where the gap is formed by the track insulation. 2nd. By varying the tension or electromotive force in the train carried circuit by causing the momentary introduction of an auxiliary track source of electrical energy to the train carried circuit at such points. To this end I employ a varying external resistance that is bridged normally by a partial circuit, that is governed in its control by a track relay of an advance block, the duty of which is simply to open and close the partial circuit or loop around the insulated joint according to danger or safety conditions in such advance block.

As the locomotive upon which the normally closed train carried circuit and apparatus is installed may pass a joint normally bridged by a partial circuit at a high rate of speed, and the contacts or wheel terminals of said train carried circuit move to quickly break and make the cab circuit to present the partial circuit there is under safety conditions afforded a compensating or safe pathway for the train carried current, which remains unaffected in its flow through the said circuit by reason of the change but on the other hand if the partial circuit is found under danger conditions to be open, the insulated joint or joints presented thereby will not introduce infinite resistance to cause a breakage of the train carried circuit but there will be introduced simply a leakage pathway resistance around said joint or joints, which resistance factor under the varying conditions of weather, type and life of joint will vary over a wide range throughout a line of way, and at certain points, the resistance thereby presented may be so low that inclusion in the train carried circuit for the instant will be so slight in effect, in varying or modifying the current flow in said circuit as to render probable a non-effect on the governing instrument and thereby cause a suppression of the signal and train control functions on the locomotive under danger conditions.

It has been proposed in order to render more effective and reliable a plan of control at block junctions or traffic controlling points, to employ in connection with each partial circuit installed at such points, an auxiliary source of electric energy, and to arrange same for coöperation with the train carried equipment, in a manner whereby an electric impulse therefrom in a prescribed direction will act on a polarized armature of the governing instrument included in the train carried circuit to maintain it in a safety position while crossing the joints, and to obtain a danger movement thereof at such points by a reversal of current delivery to said governing instrument, and thereby indicate, respectively, according to such a differential principle the safety or danger conditions, as the locomotive passes such points. The failure of the "impulse" to start from the track battery or if sent through the means provided it fail to reach the governing instrument on the passing locomotive, owing to battery failure or other cause, characterizes such a plan as inherently faulty in principle as it departs from the required engineering rule of "failure on the side of safety."

It is therefore an object of the present invention to so organize a normally closed train carried protective circuit and adjust its internal relations with the external relations of an extraneous resistance varying means located at block junctions, that under safety conditions the train carried circuit will find a safe pathway in passing from block to block through a dead-wire partial circuit of negligible resistance, resulting in a non-effect upon the governing instrument, and which under danger conditions will find the presentment of an insulated joint or joints for the purpose of interrupting or causing a diminution of current flow through said train carried protective circuit by the introduction of resistance, which resistance, however, small by virtue of the leakage pathway, and said joint, will become an efficient factor in creating a relatively large internal change or degree of magnification in modifying the current action or flow in said train carried protective circuit, in a manner to secure the necessary efficient controlling action upon the governing instrument in the production of a signal and the actuation of the train controlling devices. The partial circuit thus arranged is closed whenever the track relay or governing instrument is active and open when the same is deënergized, thereby observing the engineering rule above referred to. By the employment of all-rail track circuits and such simple and efficient extraneous means each locomotive will act as it passes over the line not only to discover by reason of such an equipment any obstruction ahead but will serve as an automatic inspector of the state or condition of the line.

The objection raised against installing automatic block systems is the matter of initial cost, and no matter what the cost per mile is the length of road to be protected is what governs the cost. In cab carried systems depending upon the presentment of partial circuits arranged in conjunction with insulated joints on one side of the track there has been heretofore imposed either the condition of placing the entire length of line over which the equipped locomotive travels in condition for satisfactory service by bonding and providing a battery equipment or else requiring the engineer to throw out of operative condition the locomotive equipment when running over unequipped track.

A special advantage of the present system of cab-signaling and speed control proposed by this invention is that if desired it can be installed at only specially dangerous points along the line of way (such as at tunnels, cross-overs, yards, curves and the like) with inexpensive track equipment and by the equipment of only a small percentage of locomotive a betterment in safeguarding the road may be obtained with a relatively small cost.

It is further an object of the present invention to provide a means that throughout the control circuits observes strictly the rule of failure on the side of safety hereinbefore referred to by producing a signal light indication by opening a circuit, *i. e.*, by employing a local cab signal circuit branch, including incandescent lamps (in multiple) so interrelated with a parallel branch circuit, including the valve holding magnet, which governs the air brake application, and a primary controlling train carried circuit, together with a common source of electric energy, whereby under safety conditions the danger lamp or lamps are furnished with a current of one intensity, normally just enough to maintain the lamps at low incandescence, for tell-tale purposes, and to furnish thereto a current of greater intensity to flash the signal lamps to full illumination, under danger conditions, and to perform these functions by simply opening the valve holding magnet branch circuit.

Wayside signals have already been located at such distances from danger points or the entrance to block sections as to provide ample space in which to bring trains to stop from customary speeds, while they are sufficiently near such points to avoid interference with the orderly movement of trains through unnecessarily retarding their progress at remote distances by reason of signal observance. Cab signaling and the automatic control of trains should likewise be established upon this principle.

To insure that trains shall receive an ample preliminary signal or be retarded or stopped before reaching a danger point or obstructed block, it will be necessary to place the signal receiving or brake applying point nearly or quite as far back as the distant wayside signal or from 1500 to 2000 feet, and providing there a means for certainly operating the same in unison with a like means at the entrance of the obstructed block or with the home external signal. The preferred type of track arrangement, for obtaining distant control through all-rail track-circuits, and which was designed to work in conjunction with the present invention, now forms the subject-matter of a co-pending application, and will not be further alluded to herein.

It is of great importance not only that the automatic controlling means on the locomotive shall be operated each time there is a danger giving condition ahead but also that the action thus inaugurated upon the controlling means shall continue to govern until the engineer takes appropriate action, and which is of itself independently adequate to cause a completion of the retardation and stoppage of a train, still will be capable under the will of the engineer to be checked at any stage of operation and allow of the restoration of the air brake system by the pushing of an electric button and the usual manipulation of the engineer's brake valve lever. The principal reason for such a plan of operation and control is that in attempts that have hitherto been made to combine signaling and automatic control, there has been the highly objectionable feature that the locomotive has been arbitrarily taken out of the hands of the engineer for the period required to consummate a quick, complete and violent emergency application of the brakes, to thereby stop a train, with no means to check such an operation at any stage or until it has completed the reduction of train pipe pressure.

The main function in applying air brakes is releasing or venting air from the train pipe, and any material reduction therein will apply the brakes. In applying an emergency application it is necessary to make a sudden reduction of air in train-pipe pressure and to this end the vent or discharge port therefor must be of a size and have a capacity to allow of the sudden and abundant discharge of air. A reduction of pressure with a given size port at the locomotive end of the train can be made more quickly on a short train than on a long one, and in order to make a valve for controlling the air relief of a train pipe operate the same for different lengths of train, in automatic train controlling devices, it has in order to make it function within practical limits been made to uncover a port large enough to effect by reason of the discharge of air therefrom the quick acting triple valve, and uniformly obtain an emergency application. One attempt to modify this action proposed the employment of a valve having a tapering form of opening therein for the purpose of insuring a gradual escape of air from the train pipe, in the manner of a service application but such a construction failed to realize the purpose sought for the reason that the valve travel was so rapid by virtue of the impact thereagainst of the reservoir pressure that the valve simply functioned to open the port to its full limit instantly.

The present invention proceeds on the plan of inaugurating a self-contained operation, *i. e.* one that while allowing a release of air in a manner to secure a reduction of speed of the train by a progressive application of the brakes with a gradually increasing efficiency that will insure the bringing of the train to a standstill in the absence of the engineer or fireman within a short distance after its actuation, still is so arranged to function in a manner to be completely under the control of the engineer, in that it can be checked even in its initial action before the restraining impulse on the train has been sufficiently effective to communicate the fact of its operation to the minds of the train crew and passengers, or in fact at any other stage of its operation. To this end there is obtained an automatic adjustment or regulation of the discharge from the train pipe that is dependent on the rate of travel of the relief or discharge valve, as well as its shape from a closed position to a service position, and thence to an emergency position caused by a releasing movement that is governed by a pressure reduction of a prescribed volume of air in an equalizing reservoir and under the influence of electrical control.

The control feature above referred to which provides that a train may at all times be put under control by an engineer forms an additional safeguard as well as a time saving provision, as it often happens a wayside signal or obstruction clears a block before an engineer of a following train reaches the entrance of the said block thereby not necessitating a slow down or stoppage.

Those objects and features of my invention which have not been mentioned in the foregoing preamble will appear in the following more detailed description of my invention, which I have illustrated in the accompanying drawings.

To carry my invention into effect I have made use of the arrangement of circuits and devices shown in the accompanying drawings.

Figure 1 shows in simple diagram the general arrangement and principle of circuit organization pertaining to the locomotive equipment. Fig. 2 shows in diagram the same circuits, connections and devices with which the locomotive is equipped, arranged in operative relation to a signal receiving and traffic controlling point on the track.

Figure 4:
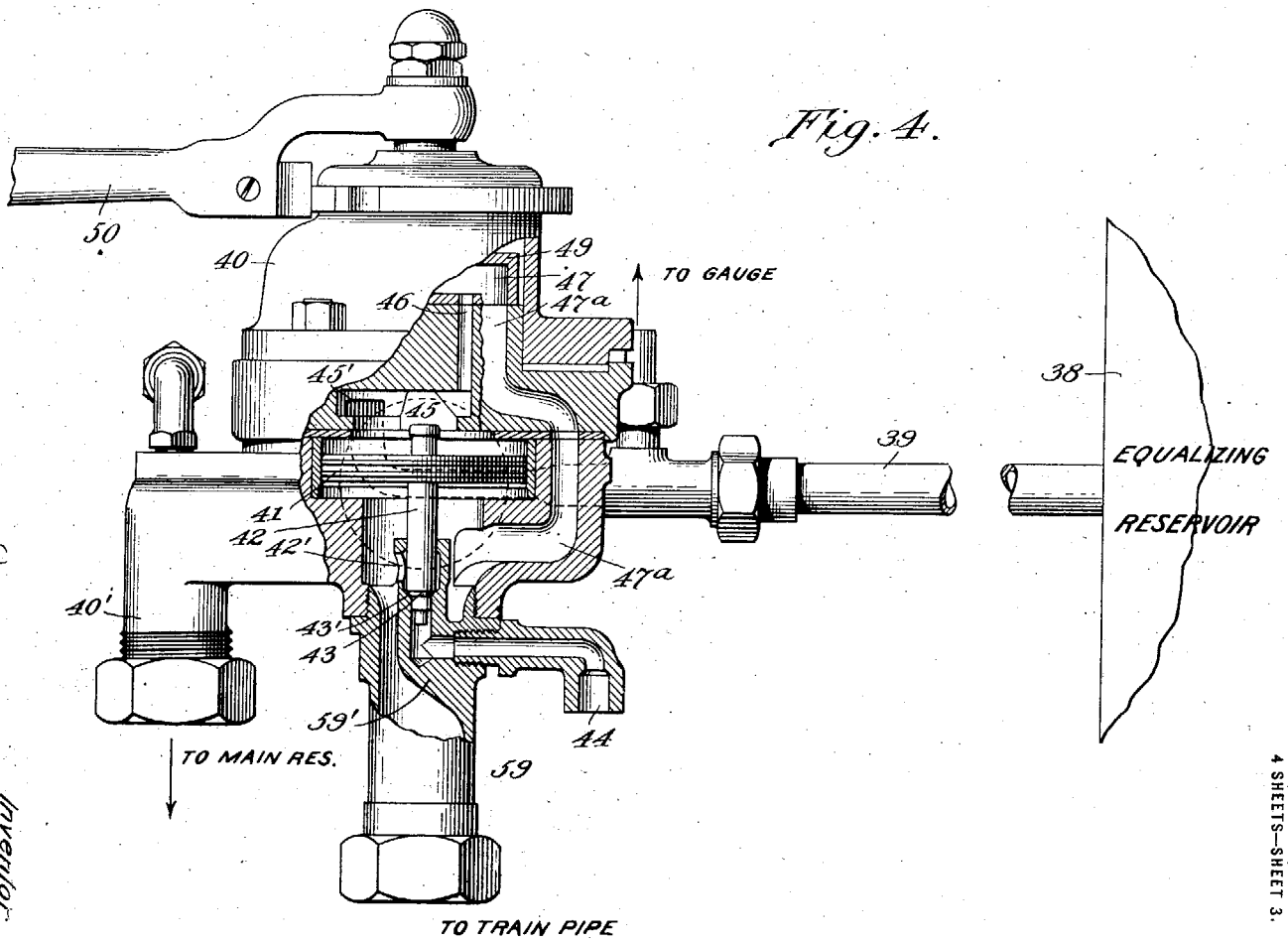
Figure 5:
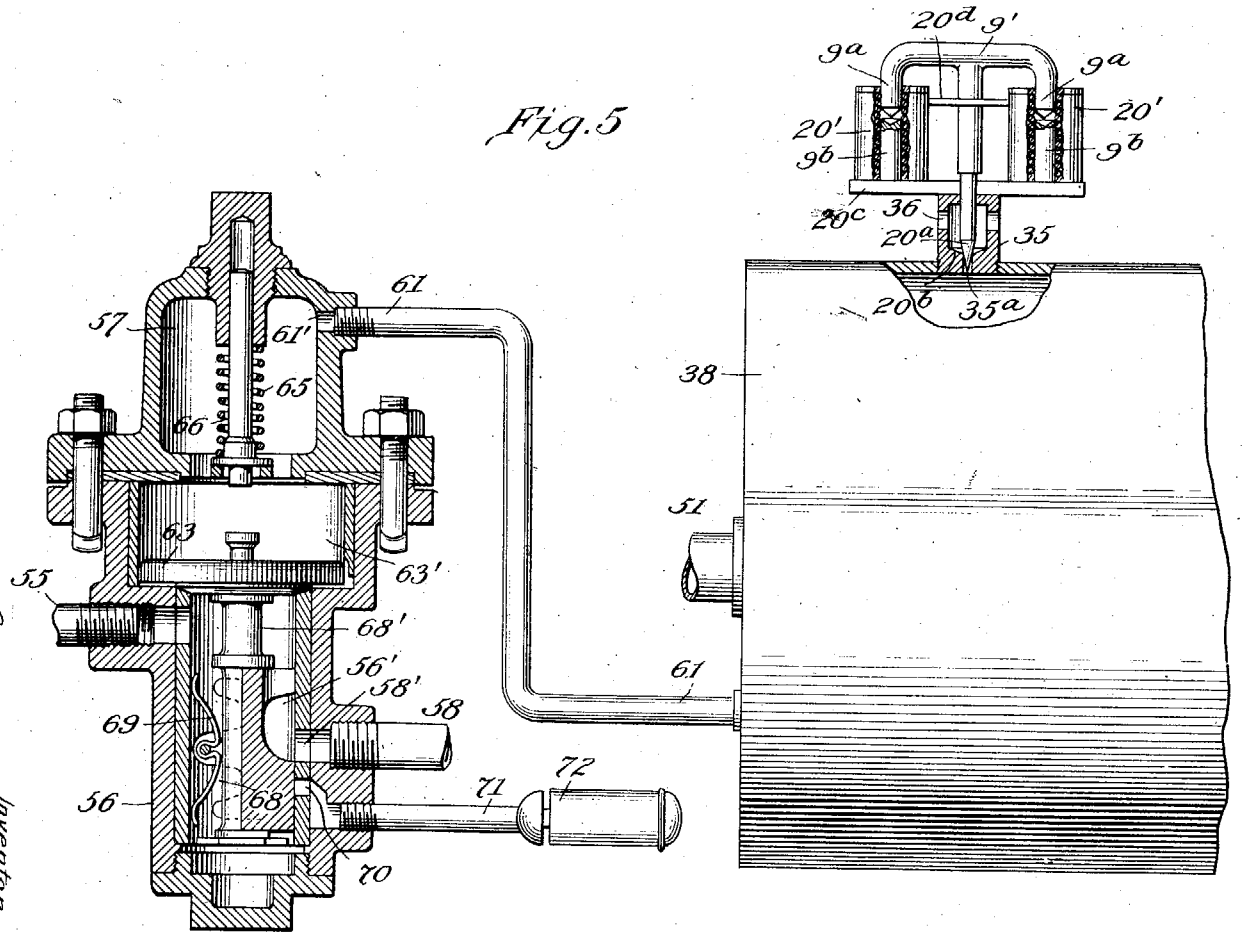

Fig. 3 shows in side elevation the usual arrangement of the essential elements constituting an air brake system provided on a locomotive, indicating their relative location and connections, together with the added elements required according to the plan of this invention. Fig. 4 shows in side elevation, and partly in section, the engineer's brake valve, and its connection with the equalizing reservoir. Fig. 5 shows in side elevation and section the valve-holding magnetic means employed for controlling the air release from the system, and the associated shut-off valve which is utilized to control the main reservoir air according to the plan of this invention.

Similar characters designate like parts in all the figures of the drawings.

Referring, first, more particularly to the simple diagram in Fig. 1, there is shown a normally closed system of circuits that comprises interrelated controlling circuits A and B that are connected in parallel with the working circuit C, said circuits being each connected with the battery conductors 10+ and 10—, respectively, at the branch junctions 11+ and 11—, thus procuring a division of current from the train carried battery 10, in a manner that is thoroughly practicable as a common source of current for both the controlling and working circuits, and the devices employed in connection therewith.

The circuit branch A may be characterized as a partial circuit that is made up of battery 10, conductors 10+ and A, the convolutions of coil 7, conductor 12, wheels 28 and 29, intervening rails $r$ and $r'$, wheels and axle 27, conductor 13, and conductor 10— to battery 10. Thus it will be seen that said circuit terminates in two conductors 12 and 13 and the wheels connected therewith which are arranged in electrical contact with the rail, whereby the circuit is normally completed between said conductors through the rail, and which are adapted to coöperate with other partial circuits arranged along the track, in order that when the equipped locomotive reaches a signal receiving or traffic controlling point under danger conditions, a change may be produced in said circuit A, associated circuit B, and an electroresponsive device arranged in operative relation with said circuits.

The two circuits A and B are arranged to include a detecting and work-circuit-governing differential relay R, that comprises a pair of proximally arranged opposing electromagnets 7 and 8, having a common work-circuit controlling armature 9, that is arranged to oscillate as shown. The electromagnets 7 and 8 are included, as shown, one in each of the respective circuits,—coil 7, in circuit A, being arranged to exert normally a stronger influence on the armature to hold it in safety position but which armature is adapted to be decisively attracted to the other electro-magnet 8, to function in the production of a change in the working circuit C in accordance with the changes initiated or produced in circuits A and B, under danger conditions, and by a method to be hereinafter pointed out. The circuits A and B also include (incandescent) tell-tale lamps 14 and 15, having the same resistance, and that are connected in series with the respective coils 7 and 8, and which serve to show by dimming the integrity of said respective circuits. Upon encountering a point of insulation along the track, in a manner to be hereinafter pointed out, circuit A will be affected by an interruption or diminution of current flow therein, by reason of the introduction of external resistance, and therefore in order to obtain a relatively large percentage of change in the current variation in coil 7, the first requisite according to the plan of this invention, is to so organize circuit A so as to make it a comparatively low resistance circuit. To this end the coil 7, is wound to low resistance, and the low resistance lamp 15, is still further reduced as a resistance factor in said circuit by providing a shunt 15′ therefor. In order to obtain a balanced relation between circuits A and B for the purpose to be presently pointed out, the lamp elements and shunts therefor are made to correspond in amount of resistance, and likewise the coils 7 and 8 are wound to a like resistance. The difference in the attraction of the respective ends of armature 9 upon a differential change in the governing magnets 7 and 8 under danger conditions in favor of 8 may be still further increased by the employment of a low resistance connection 16 between points $a$—$a$, serving as the diagonal of a Wheatstone bridge, which means affords an increased current flow to coil 8 under said danger conditions. Under safety conditions at the points $a$—$a$ the same conditions of current pressure will exist and as the pressures oppose each other the current in circuits A and B will remain balanced or at rest so far as the connecting wire 16 is concerned. Consequently there will be no current passing through wire 16.

A current of electricity starting from the positive pole of battery 10 on arriving at point 11+ divides part flowing through A, A′, to point 11— and part flowing through B, B′ to point 11—, thence uniting and returning to battery. The resistance of each arm of these respective circuits being equal to that of the other, there is normally, as is well understood, no flow of current through the cross-wire 16. But when there is introduced an external resistance, to be found at a point of insulation, into the arm A′ of the bridge, the balance of the bridge is disturbed, so that there is a flow of current through the cross-wire 16, and thence to coil 8, thereby adding an increment to the strength of current flowing therethrough. The current difference in the respective coils 7 and 8 in such a situation is increased, however, when the resistance in circuit A is increased (within given limits) and the normal resistance of the lamp arm 14 and coil arm 8 remain the same. In other words upon the introduction of track resistance in A circuit (the bridge being closed) the current in 8 coil is increased and the current in coil 7, is decreased more than if the bridge 16 had been open.

Circuit C includes resistance 17 and a divided circuit portion between branch junctions 18′ and 19′. Branch 18 includes incandescent lamp 20, arranged in shunt relation to branch 19, while the latter branch includes coils 20′ of the valve holding magnet V.

The further consideration of the locomotive equipment or system of circuits diagrammed in Fig. 1 will now be developed in the course of a further description of Fig. 2. In said figure branch 18 of circuit C is shown as including four incandescent lamps 20 arranged in multiple, while branch 19 not only includes the valve-holding magnet coils 20′ but also a current supplying contact 21 and the interposed armature 9 of the governing instrument R. The branches 18 and 19 are so related and the resistance proportioned to each other and to the electromotive force to be employed, that a current traversing said branches will be such that the valve-holding magnets 20′ will be normally supplied with current sufficient to hold the valve controlled thereby against a required air pressure with a high factor of safety, as well as being enabled to recover its armature 9′ upon release against said pressure. At the same time the danger signal lamps 20 are fed with a current only sufficient to maintain the same normally at a low incandescence for tell-tale purposes.

Obviously, when the governing magnets 7 and 8 have moved the armature 9 away from the contact stop 21 toward coil 8 to break at 21, the branch 19, including the valve-holding magnets 20′, by reason of a change in the respective strengths of magnets 7 and 8, the decreased demand for current by reason of the opening of branch 19, will on account of the presence of resistance 17 cause a more copious flow of current to the lamps 20, resulting in their full illumination. The function of resistance 17 serves in such an operation to obtain an increased voltage or terminal potential on the signal lamps by virtue of the decrease of current normally flowing through the series resistance, when the branch 19, is opened. The certainty of response of the armature should not only be positively assured by the magnification of the differential changes in said coils 7 and 8, initiated by the introduction of a small external resistance, under danger conditions, but provision should also be made to hold the armature in the required biased safety or danger positions in a manner whereby it will be maintained in either position unaffected by heavy vibration in the cab of the traveling locomotive. To this end there is provided a dissymmetry of the magnetic circuits, according to the position occupied by the armature of the governing magnets 7 and 8.

The armature 9 is shown as being pivoted at its center to a post 22 that is connected with the yoke 23 of the magnet pair. There is thus formed a magnetic circuit for each of the coils 7 and 8 that is made up of the cores 24, 25 joined with yoke 23, and having the return post 22, and completed by the armature 9 and the air gaps between the armature ends and corresponding core ends, respectively. The coil 7 may be caused to normally preponderate in its attraction of armature 9 by adjusting the stops 21 and placing the adjacent armature end thereagainst, so that the air gap between the core of magnet 7 and the corresponding end of armature 9 is less than the air gap between the core end of 8 and the other end of the armature.

The bias in favor of coil 8 when the armature has been attracted thereto under danger conditions may be positively maintained by allowing the attracted armature end to contact with the pole end of said magnet. By opening circuit B′, upon pushing circuit making-and-breaking button 26, there will follow the release of the attracted armature end from coil 8, which will upon the passage of the traffic controlling point be re-attracted to coil 7.

From the foregoing description it will be apparent that lamps 20, which give a red light, and the tell-tale lamps 14 and 15, respectively, which give a white light, are adjusted to be normally illumined to glow at a low incandescence, owing to the current adjustment prescribed by the low resistance of the valve-holding magnet, affecting lamps 20 and the resistance shunts 14′ and 15′ arranged with respect to the tell-tale lamps. These lamps therefore will be thus displayed under safety conditions, so long as the battery is effective. Should, however, the battery fail to supply the required current the lamps will not only indicate that fact by becoming extinguished but the valve-holding magnet being deënergized will release its armature and valve thereby revealing in a more positive manner a "failure on the side of safety." It will also be noted that the lamps 20 under safety conditions are caused to produce a light of one character (low incandescence) and a light of a different character (full incandescence) to indicate danger, effecting both results without requiring a make or break in the circuit within which the lamps are included.

In practice, instead of employing the conductor 13 in its full length extension, as shown, I simply connect a short length of said conductor to the framework of the locomotive, which serves as a return conductor from the wheels. It will also be noted that the front pair of wheels 28 and 29 are insulated from their axle, as indicated in a conventional manner, by the employment of heavy black circles as shown. Without this provision the axle would allow of a short circuit therefrom through the metal frame of the truck to the second pair of wheels.

At this point in the description it will be observed that it is characteristic of this invention to provide a novel arrangement of the conductors 12 and 13 of the partial circuit A, A′ with relation to the rails of the track, whereby said circuit is completed through a divided pathway made of both rails of the track, to provide a maintaining portion for circuit A, A′ of negligible resistance. The current flowing through conductor 12 divides at point *z*, part passing through wheel 28, rail *r*, to wheel and axle 27, to conductor 13; and the balance of the current flowing through conductor 12, passing to wheel 29, rail *r′*, to wheel and axle 27, to conductor 13. On account of employing such a parallel pathway through both rails of the track it is necessary to provide at signal receiving and traffic controlling points oppositely disposed insulated joints 28ᵃ in order to interrupt the current flow through the partial circuit A, A′ at the moment when the wheel terminals are separated by the said insulated joints. By such an aggroupment of insulated joints it will be found, however, necessary to bridge with a partial circuit, only one of said joints, in order to complete said partial circuit A, A′ under safety conditions, when it passes thereover. A special advantage of such a disposition of joints and means of control proposed is as stated in the preamble of this specification, that an equipped locomotive can travel over unbonded track without causing the operation of the devices thereon until a place is encountered where there are two complete breaks in the continuity of the rails found in exactly opposite points in the track.

In carrying out this invention the track way is divided up into sections or block units, the traffic rails of which are divided into all-rail standard track circuit sections, physically and electrically defined at their meeting ends by insulated joints or current obstructors to form protective control circuits, coextensive respectively with each block unit. As shown, one of the line of rails in each section is connected respectively to one line of rails in each of the immediately adjacent track circuit sections to provide an electrical conductor or closure for the train carried circuit, under safety conditions, that is electrically continuous throughout the equipped line.

Such a plan of track-circuit arrangement brings each track circuit into close juxtaposition with immediately adjacent track circuits to make every foot of the track an active factor in the production of signal and control functions, on the equipment moving thereover.

Prior to the filing of this application it was old in the art, in connection with track circuits, to so arrange a partial circuit that it connected with a live-wire loop or partial circuit the rail on one side of the track section with a correspondingly located adjacent rail in a neutral or inactive section intervening between the next adjacent track circuit section, thereby necessitating the employment of four insulated joints and an auxiliary battery for each section.

Such a plan is violative of the principle of the present invention because it introduces a short unprotective section between widely separated track-circuit sections to thereby disrupt the protective continuity afforded by the lines of rails in the contiguous track-circuits, which is the purpose of the present invention to establish.

The introduction of such unprotective sections upon which a locomotive might stand, or in which a rail might break, without causing cessation of current in the train carried circuit, and without giving rise to the sequential failure operation, to produce a danger indication, amounts to such a radical deficiency that it would not be tolerated, and as it is the purpose of this invention to do away with precisely such a faulty plan, notice is hereby given that in the annexed claims, wherein there is claimed a union between the train carried circuit and the track-circuit there is a clearly intended exclusion of the intermediate short unprotective sections just alluded to.

An important feature of the present invention involves the employment of a relatively short dead-wire loop or partial circuit arranged to normally bridge one of the pair of joints that separate immediately adjacent track-circuit sections, by connecting said loop or partial circuit to the rails on one side of the track, that have like track battery pole connections. By such an opposed relation of the track batteries in the respective adjacent track circuit sections, it will be apparent that a partial circuit connection as proposed from one rail of a given polarity in one section to a correspondingly located rail of a like polarity in the next immediately adjacent section, there will be no danger of an interchange of track-battery current between the two sections thus united by a partial circuit.

By reason of the looping connection between points or lines of rails of like polarity, in the respective track-circuits, it will be observed that electrically said loop does not form any part of the associated track-circuits but is in fact electrically segregated from the currents traversing the traffic rails thereof, because it will be noted that the loop connections are made at relatively neutral points in the respective rails.

The loop is therefore as electrically independent of the associated track-circuits, as if they were not physically connected therewith.

By reason of such interconnection of the traffic rails in the associated track-circuits, there is already provided structurally a protective means for those parts of the system of control, for revealing their breakage, by reason of the deënergization of their respective track-relays, to reveal such an abnormal condition in the train carried circuit about to pass into a given section. The incomplete or partial circuits thus formed are successively completed by the train carried circuit A, A′, when the locomotive carrying same passes the block junctions at which they are located. The local equipment of each block junction includes the conductors 32, 34, and the interposed armature and contact of the track relay that forms the partial circuit.

The conductors may be formed in duplicate in order to allow for breakage of any one. The track-relay 30 for governing the make and break of said partial circuit is located immediately adjacent thereto, and is connected with the rear end of the block rails of the section over which it presides through conductors 31 and 32, while the battery for supplying current to the track-relay 30 and the rails of said block section is connected with the rails at the advanced ends of said block. There is thus provided under danger conditions a deënergization of the track-relay 30 and an interruption of the partial circuit controlled thereby to present the resistance of the joint to affect the train carried circuit A, A′ in its passage thereover.

The devices hereinbefore described may be employed for governing the movement of a locomotive either by controlling the power of the locomotive to cut off such power or by applying the brakes. In the present case the automatic control of the locomotive and train is preferably effected by a brake application, and I will at this point describe the air brake apparatus involved and controlled by the circuit arrangement hereinbefore described.

Referring to Figs. 3, 4 and 5, I have illustrated in said views automatic controlling means arranged with the air brake apparatus of the Westinghouse system, and adapted to be actuated when there is a danger condition ahead of the locomotive according to the circuit changes hereinafter pointed out. A detailed description of the fluid pressure air brake system is unnecessary, as the present invention is shown as being employed with a system that is well known and understood. This system involves the employment on the locomotive of an engineer's brake valve 40, that is connected with the main reservoir 52 through a pipe 51 and connection 40′, to the feed valve 54, through pipe 53, thence back to the brake valve through pipe connections 55 and 58. The engineer's brake valve has also a connection 59 with the main train line pipe. These parts are common appurtenances of the Westinghouse system, and need be illustrated and described only so far as to set forth their relation to the present invention. As before stated the main or controlling function in applying air brakes is the release of the air from the train pipe. In the air brake system the operation of discharging air from the train pipe is effected by an exhaust valve controlled by an equalizing piston.

In Figs. 3 and 4, there is represented an engineer's brake valve, which is shown in the latter figure as broken away to disclose in section the brake-valve case, equalizing piston and other operative elements contained therein. 59 designates the train-pipe and its union with the engineer's brake valve, while 44 shows in section the exhaust pipe fitting that has communication with the train pipe 59, through the exhaust valve casing 59′. The valve for controlling the exhaust ports 42′ and 43′ that affords communication from the train-pipe to the exhaust pipe fitting 44, consists of the equalizing piston 41 and the train pipe exhaust valve 43, that is carried by the lower end of the stem 42. The piston 41 provides an equalizing feature by having air on both sides thereby forming a dividing line between the train pipe and chamber 45. The lower portion of the chamber 45 is so shaped as to form a piston cylinder. Chamber 45 is connected, through port 45′ and pipe 39, with the usual equalizing reservoir 38.

In making a reduction of train-pipe pressure the first discharge of air from the system comes from the chamber 45, and is immediately followed by a discharge of air from the train-pipe through the exhaust valve owing to the upward movement of the equalizing piston and the opening of ports 42′ and 43′, whenever there is a relief of pressure in chamber 45.

The controlling means ordinarily employed for releasing the air from the chamber 45 is the rotary valve 49. This valve serves to perform the general functions of regulating the flow of air from the main reservoir to the train pipe for releasing the brakes and from the train-pipe into the atmosphere for applying the brakes, accomplishing these results by reason of controlling the flow of air through various ports in the rotary valve seat.

According to the plan of this invention a train-pipe reduction is secured by a reduction of pressure above the equalizing piston by electrical control but instead of discharging directly from the chamber 45 to the atmosphere it is proposed to take air from the equalizing reservoir." In other words it is proposed to provide for automatic control of the equalizing piston without regard to the position of the hand controlling lever device 50, that is employed to manipulate the rotary valve. It is to be remembered, however, that train-pipe pressure connects at all times with the chamber 45, when the rotary-valve and operating handle 50 are in "running position," *i. e.* when the top and bottom of the equalizing piston are directly connected. This position of the engineer's brake-valve is shown in Fig. 4, where the cavity 47 of the rotary-valve 49 connects the port 47ª with port 46. In said figure it will be seen that port 47ª leads from the face of the rotary-valve seat into the train-pipe and allows of communication therefrom to the chamber 45, through cavity 47, and port 46, which latter leads from the face of the rotary valve seat into chamber 45.

As it is desirable according to the plan of this invention to effect an air-brake application when the engineer's brake-valve is in "running position" and the train pipe is connected with chamber 45, and as under such conditions it is necessary that the pressure in chamber 45 shall change at a greater rate, as a result of any relief action than can be re-supplied by the train-pipe pressure under such conditions, for the same period of time, it will now be explained how a release of air pressure from the equalizing reservoir will realize such a result. To the end of securing a requisite relief of pressure in chamber 45 under these conditions, I provide preferably a one-eighth inch opening or vent in the equalizing reservoir, while the feed through port 46 to chamber 45 is preferably one-quarter inch in diameter. The question of effective operation in reducing pressure in chamber 45 under these conditions is not one of proportional areas alone but one of areas plus velocity of discharge. The vent from the equalizing reservoir being directly to the atmosphere, *i. e.*, from a high pressure to a low (14.7 pounds) there will be effected a high rate of discharge and much greater than can be obtained from the train-pipe to the chamber 45, through a larger opening because the pressure discharge from the train-pipe to a pressure but slightly below it results in a slow velocity or rate of discharge, which cannot equal that from the equalizing reservoir to the atmosphere.

The means for obtaining the vent from the equalizing reservoir will now be described with reference to Fig. 5. Referring to said figure, 20ª designates a needle valve that is arranged to seat on the valve-seat 20ᵇ, that is inclosed by the pipe fitting 35, which latter is adapted to be screwed into a threaded opening formed in the wall of the equalizing reservoir 38, the flow therefrom being through outlet 35ª, to and through outlets 36, when the said valve is raised. The stem of the needle-valve is extended vertically to project through the yoke 20ᶜ, guide 20ᵈ, and connects centrally with the armature 9′ of the electro-magnet 20′. The armature 9′ is provided at its ends with pendent arms 9ª that project plunger-like into the core spaces of the respective coils 20′, which arms in their normal closed position almost contact with the core ends 9ᵇ of said coils.

The air controlling mechanism involves not only means for releasing air pressure in the equalizing-reservoir and the resulting air release in the train-pipe as above described, but in order to successfully cause a reduction of pressure in the system and thereby secure a prompt and effective application of the brakes when the engineer's brake valve is in "running position" it is also necessary to cut off the flow of air from the main reservoir 52 to the train pipe, while the latter is being vented. For this purpose this branch of the invention provides at a convenient point in the air pipe 55—58, extending from the feed-valve 54, to the pipe connection 58′ of the engineer's brake-valve, a special quick-acting shut-off valve, which is operated by movement of an inclosed piston, that is subject on one side to the pressure of air from the feed-valve and on the other to the pressure of air in the equalizing-reservoir. Referring particularly to Fig. 5, there is shown a sectional view of said valve, in which the valve body is shown as being made up of two separable portions 56 and 57 bolted together, while the movable parts contained therein are shown in their normal positions. 55 designates the feed connection, while 58 is the train pipe connection to the shut-off valve. 68 designates a slide-valve that is mounted on and carried by the stem 68′ of the piston 63. 69 designates a spring for guiding and balancing the slide-valve 68. This slide-valve 68 opens and closes communication between the valve chamber 56′ and the train-pipe connection or port 58′. The slide-valve also opens and closes communication between said chamber 56′ and the atmosphere through bleeding port 70, pipe 71 and whistle 72. The piston 63 is adapted to travel up and down in the cylinder portion 63′ of the valve to cause the slide-valve to open and close the ports 58′ and 70, respectively. Said piston is moved back and forth by creating a difference of pressure on its two faces, being subject on its lower side to the main reservoir pressure through the feed-valve and on its upper side to the equalizing reservoir pressure, the latter pressure being rendered effective by reason of the communication from the equalizing reservoir to the upper chamber 57, of the shut-off valve through the pipe 61 and port 61′. As an aid to good operation the piston 63 engages a spring-controlled plunger 65 that is subject to the influence of the spring 66 arranged in operative relation therewith, as shown, and which serves to cushion the blow upon the lifting piston as well as aiding in starting the piston in its return downward movement. Thus it will be seen that the valve 68 is given immediate closing movement upon the discharge of air from the equalizing reservoir by the automatic opening of the needle-valve when released by its magnet, and serves in its movement not only to close the passage in the train-pipe but also to release the air from the chamber in which said valve moves and into which the air flows from the main reservoir through the feed-valve. The air whistle connected as described serves to notify the engineer, by continuous blowing under main reservoir pressure, that said shut off valve has been brought into action. The air relief valve of the equalizing reservoir can be closed, and the stop or cut-off valve in the feed air pipe restored to its normal position by simply pushing electric break and make button 26, included in circuit B′, hereinbefore referred to, while the brakes may be released by turning the engineer's brake valve handle 50 to release position.

The automatic controlling devices just described for applying the air brakes are of course governed by the valve-holding magnet V under the influence of the circuits heretofore described, but the same may be employed with a cab system of any kind, although that shown is preferable.

When the air brake apparatus stands in the position shown in the drawings, it will be obvious that the brakes may be applied by hand control in the usual manner. Should, however, the armature 9 of the governing magnet R be actuated to break the contact 21, the valve-holding magnet V will be deënergized, thereby liberating its valve which will thereupon be blown off of its seat by the air pressure venting from the equalizing reservoir, which as before set forth will cause an air brake application.

Although I have illustrated but one particular system of locomotive equipment and one particular system of track-equipment in which my invention may be embodied, it must be understood that the same may be embodied in various other structures and arrangements and combinations of circuits, all within the principles and scope of this invention.

What I claim as my invention and desire to secure by Letters Patent is:

1. In a system of the character described, the combination of a local train carried circuit, an armature controlling said circuit, controlling means for said armature including parallel train-carried circuits, a bridge wire included in said parallel circuits and translating devices included, respectively, therein on one side of the bridge wire and controlling devices included, respectively, in said circuits on the other side of said bridge wire, one of said parallel circuits being connected with the track rails, and a means located along the way for varying the current in the track connected circuit.

2. In a system of the character described the combination of a train-control and signal circuit, an armature controlling said circuit, controlling means for said armature including parallel circuits, one of which is completed through the rails over which it is carried and controlling devices and resistance members arranged in series in each of said circuits, a low resistance conductor connecting the parallel circuits at a point between the resistance members and controlling devices; and means located along the way for varying, under danger conditions, the current in the track connected parallel circuit.

3. In a system of the character described, the combination of a train carried working circuit, an armature controlling said circuit and controlling means for said armature comprising a pair of opposing electromagnets, and a current supplied bridge, including in one pair of its uniting arms the respective magnets, and in its other pair of uniting arms prescribed resistances and a bridge wire connecting the uniting arm pairs; a track circuit including a portion of the rails thereof in one branch of the uniting arms first mentioned, means controlled by said track circuit for varying under danger conditions the resistance of one of the magnet pair.

4. The combination of a train-carried signal and train control mechanism, a local train-carried circuit therefor, two coils arranged to act in opposition in the control of said local circuit, a circuit for each of said coils, one of which is completed through the rails of a track and that is arranged in current balance with the other circuit, a track resistance means for altering the balance in said circuits by introducing resistance in one of them, and a bridge means for further altering the balance in said circuits upon a change of resistance in the track completed circuit.

5. The combination with a line of track and a vehicle movable therealong, a normally closed circuit carried by said vehicle and arranged in electrical contact with the rails, of a magnet included in said circuit, an opposing magnet, a closed circuit therefor, a signal controlling means governed by said opposing magnets, a source of electric current carried by said vehicle, and means for automatically varying inversely and unequally the current strength in said magnets upon a variation of current in the normally closed circuit, first mentioned, under danger conditions.

6. The combination of a train-carried signal and train control mechanism, a local train-carried circuit therefor, an electromagnetic device for controlling same embodying two coils whose action is governed by variations in the energy relation thereof but which are normally arranged in current balance, a circuit for each of said coils, one of which is completed through the rails of a track, while the other is closed, a manually operated make-and-break device included in said latter circuit, a track resistance means and a means for altering the balance in said circuits of the current relation in correspondence to a change of resistance in the track completed circuit, by reason of an increment of current in the last mentioned circuit.

7. The combination of a train-carried signal and train control mechanism, a local train-carried circuit therefor, an electromagnetic device for controlling the same embodying two coils whose action is governed by variations in the energy relation thereof, a closed circuit for each of said coils having a current relation that is normally in balance, one of said circuits being completed through the rails of a track, a track resistance means included in the track completed circuit and a means for altering the balance in said circuits of the current relation thereof by an increment of current in the last mentioned circuit in correspondence to a change of resistance in the track completed circuit.

8. The combination on a locomotive of a normally closed track completed circuit, a locomotive-carried source of current therefor, a magnet included in said closed track completed circuit, a signal controlling armature that is released upon a certain decrease of current in said magnet, a second magnet for attracting said armature upon release, a closed circuit therefor and means for causing a shifting of current from the first mentioned magnet to the second mentioned magnet upon a change of resistance in the said track completed circuit.

9. The combination with a line of track, and with a vehicle movable there-along, a signal and a valve controlling circuit, comprising a permanently closed signal circuit and a balancing shunt, a valve holding magnet included in said shunt, a valve controlled by said magnet, a neutral armature for opening and closing the shunt, opposing electromagnets arranged to exert opposing pulls on said armature, one of said magnets preponderating to hold said armature normally in a safety position to close the shunt and thereby hold the valve closed, a circuit for each of said magnets, one of which is completed through the rails of the track while the other is normally closed, and that are arranged in current balance with each other, a track resistance, and a means for distributing the balance in the energy relation of said circuits, by an increment of current in the last mentioned closed circuit normally in correspondence to a change of resistance in the track completed circuit.

10. The combination with a line of track, and a vehicle movable there-along, a pair of circuits carried thereby, one of which is normally completed through a portion of the rails of the track while the other circuit is normally closed, a source of electric energy for said circuits, a pair of magnets included, respectively, in said circuits, a signal controlling armature therefor, resistance means located at points along the line of track for varying the resistance of the rail completed circuit, when said resistance is encountered under danger conditions, and means for automatically varying the current strength in said magnets by an increment of current in one of said magnets in correspondence with the track resistance introduced under danger conditions.

11. The combination with a line of way, and a vehicle movable therealong, a pair of vehicle-carried circuits, a translating device controlled by said circuits, and responsive to a reciprocal variation of current strength in said circuits and means for automatically decreasing the current strength in one circuit and simultaneously increasing the current strength in the other circuit under danger conditions.

12. In a signaling system, in combination a line of track, a vehicle movable along said track, a signal located on said vehicle and means for controlling same, comprising a relay having opposing coils and a common armature for the same, arranged in controlling relation to the signal controlling means, a circuit for each of said coils, one of said circuits connecting with the rails, means subject to the control of a danger condition on said track for varying the said track connected circuit to cause a decrease in current strength and means for simultaneously varying the current in the other circuit to cause an increase of current strength.

13. In a cab signaling system, in combination, a signal located on a vehicle movable along a line of track, means for controlling the same, comprising a relay having opposing coils, a common armature therefor, a circuit for each coil, one of which is permanently closed and the other is normally completed through a portion of the rails of the track, resistance means on the track for varying the track completed circuit, and a means connected with both circuits for varying the current flow in the permanently closed circuit upon the varying of current flow in the track completed circuit upon the inclusion of the track resistance therein.

14. The combination with insulated track section circuits and a vehicle movable therealong, a normally closed vehicle circuit terminating in contact with the rails, an auxiliary circuit controlled thereby, a vehicle carried current supply therefor, coöperating electric danger signal and electromagnetic brake controlling means included in said auxiliary circuit and arranged in shunt relation a resistance arranged in series with said electric danger signal and electro-magnetic brake controlling means, as and for the purpose set forth.

15. In a system of the character described, the combination of the following instrumentalities, in operative relation, to wit: a source of electric energy, a lamp-circuit, a shunt for said lamp-circuit, a lamp regulator and a valve-control magnetic means included in said shunt, a resistance in series with said lamp and shunt circuits and means responsive to a danger condition on the track for opening said shunt circuit.

16. A locomotive carried signal system including an indicating device thereon, parallel closed circuits one of which includes said indicating device, a source of electricity normally supplying a predetermined current to said circuit and device and electrical means responsive to a predetermined condition on the track for increasing the current flow through the indicating device upon the opening of the circuit that is arranged in parallel with the circuit including said indicating device, substantially as described.

17. In a protective system for railways, a track divided into blocks, a normally closed track-circuit including an electromagnet for each block, a train carried source of electricity, a train control circuit fed by said source of current and subject to the control of the respective track electromagnets, an electromagnet included in said train control circuit, an air brake valve controlling means controlled by the last mentioned magnet, a lamp branch circuit receiving normally a prescribed current from said source of electricity, a lamp in said branch circuit and an electrical means responsive to a change of condition for increasing the flow of current through the lamp.

18. In a protective system for railways, a track divided into blocks, a normally closed track-circuit including an electromagnet for each block, a train carried source of electricity, a train control circuit fed by said source of current and subject to the control of the respective track-electromagnets, an electromagnet included in said train control circuit, a lamp branch circuit receiving a normally prescribed current from said source of electricity, a lamp in said branch and an electrical means responsive to a change of condition in the train control circuit for increasing the current flow through the lamp.

19. In a system of the character described, a source of train carried electrical energy, a working circuit comprising train carried closed parallel branches, lamps and an electromagnetic valve-controlling means included, respectively, in said branches, a resistance means included in series with said branches having a resistance that is prescribed with relation to that of the aforesaid mentioned lamps and the electromagnetic means to normally cause the lamps to be supplied with current to burn at a low incandescence and when the electromagnetic means is inactive by the opening of the branch circuit thereof to cause an increase of current through the lamps to make them burn at full illumination, and electrical means responsive to a predetermined condition on the track for opening the branch circuit including the electromagnetic means, substantially as described.

20. In a system of the character described, a source of train carried electric energy, a working circuit comprising train carried closed parallel branches, lamps and an electromagnetic means included, respectively, in said branches, the resistance of the latter being less than that of the lamps, when the circuit therethrough is closed, a resistance means included in series with said branches having a resistance that is comparable with the resistance in the aforesaid mentioned lamps and the electromagnetic means, and that prescribes an increased flow of current through the lamps when the magnetic means becomes deënergized upon the opening of the branch circuit in which it is included and an electrical means responsive to a prescribed condition on the track for opening and closing the branch circuit having the electromagnetic means, substantially as described.

21. The combination with a train-carried working circuit, and a source of electrical current supply therefor, separable contacts in said circuit, a valve holding magnet included in said circuit, a parallel circuit connecting around said magnet and contacts, an incandescent lamp included in said last mentioned circuit, a prescribed resistance included in circuit between the source of current and the connection of the lamp branch with the valve holding magnet branch of the working circuit, a magnetizable part for holding said contacts in engagement, a pair of opposing magnets one of which releases the magnetizable part upon a decrease of current therein and the other of which attracts said magnetizable part upon an increase of current therein, said magnets thereby coöperating to hold the contacts closed in one condition and to open same in another condition and normally closed interrelated controlling circuit including, respectively, said magnets and means located along the way for varying the resistance of the circuit including the magnet to be de-energized.

22. In a system of the character described, the combination substantially as described, of an air brake system having a vent, a valve for controlling the same, a magnet controlling the valve, separable contacts, a normally closed circuit including said magnet and separable contacts, a means along the track for controlling the separation of the contacts to open said circuit, a parallel circuit connecting around said magnet and contacts, incandescent lamps including in said last mentioned circuit, resistance means for prescribing a suitable current flow to said magnet and parallel circuits, said circuits having each a prescribed resistance, whereby to normally cause a greater predetermined flow of current through the magnet to hold the valve controlled thereby closed and to prescribe a flow of current through the lamps sufficient to illuminate them to a low incandescence said first mentioned resistance being also adapted upon the opening of said magnet circuit to cause an increase of current flow through the lamps to raise them to full illumination.

23. In a system of the character described, a train carried source of electric energy, a signal and train control circuit conductively connected, a pair of control circuits conductively connected, a circuit-interrupter included in said train control circuit and an electro-magnetic means for governing said circuit-interrupter that is included in said control circuits and means for interrupting one of said control circuits that is located along the line of way and means included in each set of circuits for causing a shifting of current from the interrupted circuit to the other companion circuit upon the interruption of one of said control circuits, substantially as described.

24. In a system of the character described, a train carried source of electric energy, a lamp-circuit and a shunting train control circuit, a pair of control circuits, said circuits being all conductively connected and fed by the same source of electric energy, a circuit-interrupter included in the train control circuit and an electromagnetic means comprising a pair of opposing coils for governing said circuit-interrupter, that are included, respectively, in said control circuits and means located on the track for interrupting one of said control circuits and means included in each set of circuits for causing a shifting of current from the interrupted circuit to the other companion circuit in each set, substantially as described.

25. In a system of the character described, a train-carried source of electrical energy, four train carried closed parallel circuits therefor, conductively connected, lamps and an electro-magnetically controlled valve means, included, respectively, in two of said circuits, the resistance of the latter being less than that of the lamps, when the circuit therethrough is closed, a resistance means included in series with said two circuits and having a resistance that is adjusted with respect to the resistance of the aforesaid mentioned lamps and the electromagnetic means and that prescribes an increased flow of current through the lamps when the magnetic means becomes inactive, the two other circuits constituting control circuits for the circuit including the magnetic means said circuits branching off in parallel at a point between the source of current and the aforesaid resistance, one of the control circuits being normally completed through the rails of the track, two coils arranged to act in opposition in the control of the circuit including the electromagnetic means, said coils being included, respectively, in said control circuits, resistance included, respectively, in series with said coils, a bridge wire of negligible resistance connecting said control circuits at a point between the resistances located as described and the respective coils, the total resistance of the respective control circuits being adjusted to normally provide a balanced energy relation of the current flowing therethrough, and an insulated joint resistance included in the rails of the track for interrupting the track completed control circuit in its passage thereover.

26. A plurality of all-rail track circuits arranged in immediate relation to each other, a normally closed circuit carried by a vehicle movable on the rails including the rails and a track loop of negligible resistance at a predetermined point, and directly controlled by the adjacent track circuit, and a second closed circuit including signal and vehicle control mechanism controlled by the first mentioned circuit.

27. A plurality of all-rail track circuits, arranged in immediate relation to each other, a normally closed circuit movable thereover, the rails of the track circuits constituting a maintaining portion of negligible resistance for said circuit, a partial circuit of negligible resistance for said circuit that is substituted for the maintaining portion, with non-operative effect on said circuit, when the latter reaches a predetermined point, under safety conditions, said branch being directly controlled, by each track circuit encountered, a second closed circuit controlled by the first mentioned circuit and signal and control mechanism included in the second closed circuit.

28. In a protective system for railways, a track divided into blocks of the all rail track circuit type including a relay and a source of current, a loop of negligible resistance connecting rails of adjacent blocks and normally closed by said relay, a partial closed control circuit carried by a vehicle which circuit includes and is normally closed by the track rails in the individual blocks and said rails and the loop aforesaid as the vehicle passes from one block to the next, and a normally closed working circuit including vehicle control devices carried by the vehicle operative upon cessation of current in said working circuit, said working circuit being opened or closed by the control circuit.

29. In a protective system for railways, a track divided into blocks of the all rail track-circuit type, including a relay and a source of current, a loop of negligible resistance normally closed by the adjacent relay and connecting respectively with adjacent rails, a partial closed control circuit carried by a vehicle movable over the rails and normally closed through the rails and the loop aforesaid, and a normally closed working circuit including vehicle control devices carried by the vehicle operative upon interruption of current in any of said circuits.

30. The combination with track circuit sections, loops of negligible resistance connecting successive sections and opened or closed in consonance with current conditions in the corresponding sections of a cab-carried circuit normally completed through the traffic rails whereby it is conductively continuous through every part of the traffic rails over which it traverses and thereby maintains its current flow constant while entering and leaving a track circuit section under safety conditions, a second cab carried circuit, electromagnetic means in the first cab-carried circuit acting upon interruption of current therein to cause interruption of current in said second cab-carried circuit, and train control means in the second cab-carried circuit that is responsive to an interruption of current therein; whereby the functioning of the train control means is dependent upon the interruption of the current therein and in said second cab-carried circuit, caused by the previous interruption of the current in the first-mentioned cab-carried circuit.

31. In an apparatus for automatically bringing a railway car or vehicle to rest without the intervention of the engineer, the combination with a working circuit of an electrical signal therein for notifying the engineer or driver that the apparatus is in normal or danger position or condition, stopping devices controlled by said circuit, a magnet in said working circuit for the stopping devices, both of the elements in the working circuit being actuated under danger conditions by an interruption of current, a vehicle carried source of electric current for said working circuit, a control circuit that receives its current from said source, a control magnet included in said control circuit and that is responsive to an interruption of current in said circuit, and which when so affected causes an interruption in the working circuit, a track divided into blocks of the all-rail circuit type, each including a relay and a source of current, and partial circuit devices directly controlled by the relay to render the control circuit operative or inoperative.

32. An apparatus for controlling the movement of a locomotive on a line of track, made up of a plurality of normally closed track-rail circuits, the combination with an air-brake system, a valve operating to control said air brake system, an electromagnet governing said valve, a normally closed circuit including said electromagnet arranged on said locomotive, a second normally closed circuit arranged on said locomotive, an electromagnet having an armature, and included in said circuit, said armature being included to normally close said first mentioned circuit, and partial circuit elements upon the road bed controlled, respectively, by the track-rail circuits for automatically changing the condition of the last mentioned magnet to open the first mentioned circuit and thereby operate the air brake system.

33. The combination with a pair of traffic rails divided into blocks or section circuits, a track battery included in the advanced end of each section circuit and a track relay included in the rear end of each track section circuit, a track insulation separating the traffic rails of one section from another to form independent track section circuits, and a partial circuit connecting corresponding rails of like polarity of adjacent track circuits to form a loop around one of the track insulation points, the track relay of each section being arranged to control said partial circuit at the rear end of the section circuit, a visual signal and movement controlling means carried on a locomotive traversing said traffic rails, and means for automatically controlling said means that is governed in its control by the condition of said partial circuit.

34. A locomotive bearing two interrelated circuits, a source of electric energy therefor, a pair of coils, one included in each of said circuits, a common signal controlling armature therefor, one of said circuits connecting with the rails in the manner shown to provide a divided pathway through said rails, said circuit terminating on one hand in connection with the front insulated pair of wheels of the locomotive, and on the other hand in an adjacent pair of wheels, in combination with a railway track, insulated joints arranged directly opposite each other in both the right and left hand rails thereof, a source of electric current connected to said rails at one end of a section defined by said joints, a track-relay connected at the opposite end of the section, and a loop connecting the rail ends of adjacent sections, said track-relay controlling the opening and closing of said loop.

35. A locomotive carrying a partial circuit, including a source of electric current and a signal means arranged in operative relation therewith, said circuit terminating in a pair of insulated wheels, another pair of wheels forming the other terminals of said circuit, in combination with a railway track divided by insulated joints into track section circuits having a track battery and relay connected to each, the insulation of one rail being opposite to that of the other between each track-section, and a partial circuit connecting adjacent rails of like polarity around the insulation on one side of the track, said partial circuit being controlled by an adjacent track-relay, substantially as shown and described.

36. The combination with an automatic train control system and a track circuit, of an air-brake system, a normally closed pressure relieving valve for said system, separable contacts, electromagnetic means for holding the valve against its seat, and included in said circuit, parallel train-carried circuits, a pair of opposing electromagnets, included, respectively, in said circuits and connected by a yoke and having a common magnetic return member, a centrally pivoted common armature mounted on said magnetic return member, the ends of which are disposed opposite the pole ends of the respective electromagnets, said magnets operating reciprocally, one by a decrease and the other by an increase of current strength to cause the movement of said armature from a safety position to break said contacts and means controlled by a track circuit for varying the current in one of said parallel circuits.

37. A locomotive provided with a normally closed control circuit, an electrically controlled signal therefor that is adapted to be operated to function by said circuit to signify danger when said circuit is broken, a locomotive carried source of electrical energy designed to maintain a constant current, two conductors arranged one in advance of the other and terminating in connection with wheels that are insulated from each other, sectional insulated rails, said wheels being in electrical contact with the rails, circuit connections with said source of energy, an electromagnetic means for making and breaking the first mentioned circuit that is included in the circuit made up of said conductors and which is completed through the rails except when the wheels are passing over a break or insulation between two adjoining rails on both sides of the track and a loop conductor extending around one of said joints and connecting with rails of like polarity, a track-relay for normally holding said loop closed, and an adjacent track circuit for including said track-relay, substantially as described.

38. In a system of the character described, a source of electricity carried on a locomotive or car, electrically controlled means carried on said vehicle for producing predetermined results thereon corresponding to conditions obtaining at predetermined points on a railroad, comprising a normally closed circuit carried by said locomotive, insulated truck wheels, uninsulated wheels and a metallic pathway formed by the rail portions of the track lying therebetween for normally completing said circuit, insulated joints included in the rails at predetermined points, a conductor connecting adjacent rails around insulated joints to form a partial circuit for completing the first mentioned circuit when passing thereover, a means for opening and closing said conductors for interrupting or establishing the normally closed circuit, a magnet included in said first mentioned circuit, an opposing magnet, a closed circuit therefor, a signal controlling means governed by said opposing magnets and means for automatically varying inversely and unequally the current strength in said magnets upon a variation of current in said first mentioned normally closed circuit, when the track connected conductor is opened under danger conditions.

39. In a protective system for railways, a plurality of all-rail track circuits each including an insulated traction section, a source of current, and a relay; a control circuit carried by a vehicle; partial circuit elements associated with the track and directly controlled by said relay to determine the condition of said control circuit; a second circuit on the vehicle normally maintained closed by said control circuit; and signal and train control mechanism rendered operative upon cessation of current in any of said circuits.

40. In a protective system for railways, a plurality of all-rail track circuits each including an insulated track section, a source of current, and a relay; a track loop of negligible resistance connecting rails of adjacent track sections and directly controlled by said relay, a control circuit carried by a vehicle normally closed through the rails or through the rails and said loop; a second circuit on the vehicle normally maintained closed by said control circuit; and signal and train control mechanism rendered operative upon cessation of current in any of said circuits.

41. In a protective system for railways, a track divided into blocks of the all-rail track circuit type each including a relay and a source of current, a vehicle-carried normally closed control circuit movable over the rails, a normally closed working circuit including signal and vehicle control mechanism, means in the control circuit to open and close the working circuit, and partial circuit devices directly controlled by the relay to render the control circuit operative or inoperative, whereby failure of current in any of the indicated circuits causes the operation of the signal and vehicle control mechanism.

JOSEPH WHITMAN BUELL.